United States Patent [19]

Bertocci et al.

[11] Patent Number: 4,519,073
[45] Date of Patent: May 21, 1985

[54] BIT COMPRESSION MULTIPLEXER

[75] Inventors: Guido Bertocci, Neptune; Stephen M. Walters, Aberdeen, both of N.J.

[73] Assignee: AT&T Bell Laboratories, Murray Hill, N.J.

[21] Appl. No.: 505,926

[22] Filed: Jun. 20, 1983

[51] Int. Cl.³ ............................................. H04J 3/16
[52] U.S. Cl. .................................. 370/118; 370/109; 370/110.1; 370/111; 375/112
[58] Field of Search ................ 375/112, 122; 370/118, 370/111, 110.1, 109

[56] References Cited

U.S. PATENT DOCUMENTS

| | | | |
|---|---|---|---|
| 3,748,393 | 7/1973 | Baxter | 370/111 |
| 4,059,731 | 11/1977 | Green et al. | 370/112 |
| 4,237,552 | 12/1980 | Aikoh et al. | 370/118 |
| 4,303,803 | 12/1981 | Yatsuzuka | 177/15.55 R |

*Primary Examiner*—Douglas W. Olms
*Assistant Examiner*—Timothy K. Greer
*Attorney, Agent, or Firm*—John K. Mullarney

[57] ABSTRACT

A bit compression multiplexer (FIG. 2) for a pair of time division multiplexed digital bit streams each one of which includes a plurality of PCM encoded signals deposited in separate and distinct channels of a repetitive frame and signaling bits multiplexed therewith. The PCM encoded signals of successive frames are normally bit compressed (23) into n-bit signals, but periodically the encoded signals of a frame are bit compressed into n−1 bit signals. The bit compressed signals of the pair of bit streams are time division multiplexed (24) with each other, with the multiplexed compressed signals occupying separate and distinct channels of a repetitive frame. The signaling bits are extracted (21) from the pair of digital bit streams and are inserted (24) into predetermined n−1 bit channels of the last-recited repetitive frame. The signaling bits that are placed in a given channel are related to the encoded message signal of that channel.

8 Claims, 4 Drawing Figures

BIT COMPRESSION MULTIPLEXER

TECHNICAL FIELD

The present invention relates to digital transmission systems and, more particularly, to a bit compression multiplexing technique.

BACKGROUND OF THE INVENTION

The first step in understanding a transmission system is to define the basic broadband transmission unit. For analog systems, this would be a channel group, which prior to transmission is typically multiplexed into supergroups and mastergroups. For digital transmission, the basic unit is the DS1 signal. The DS1 signal developed by a digital channel bank (e.g., the D-3 Channel Bank, as disclosed in U.S. Pat. No. 4,059,731, issued Nov. 22, 1977 to J. H. Green and J. E. Landry) and transmitted over a T-1 transmission line (1.544 megabits per second) is, at present, the workhorse of the Bell System digital transmission network.

The format of the DS1 digital signal consists of 24 eight-bit words and one framing bit for a total of 193 bits per frame. The 24 words typically represent 24 separate and distinct messages deposited in 24 separate and distinct channels. The words are PCM (pulse code modulation) encoded and the least significant bit (i.e., eighth bit) of a channel is periodically dedicated (every sixth frame) for signaling purposes.

Over the past several years there has been increasing interest in achieving a more efficient digital encoding. For an evolving digital network, a most interesting application is the possible replacement of the 64,000 bit-per-second (bps) PCM signal (8 bits per channel, repeated at an 8 kHz rate) for telephony. The reason, of course, is to achieve bandwidth compression, and thus a concomitant increase in transmission capacity. To this end, the patent application of D. W. Petr, Ser. No. 343,355 filed Jan. 27, 1982 discloses an efficient, robust, bit compression algorithm. In accordance with the Petr invention, each 64 Kbps signal is converted or compressed to a 32 Kbps signal thereby doubling the capacity of a T1 line, for example.

Using the Petr algorithm, a pair of DS1 digroups (digital groups) can be bit compressed and multiplexed together to form a digroup of twice the regular (T1) transmission capacity, but with the very same bit rate (1.544 Mbps). However, there remains the problem of signaling. With a DS1 digital signal the least significant bit of a channel is periodically preempted for signaling purposes with little degradation in performance. But, to periodically preempt one of the four bits of a sub-rate (32 Kbps) channel for signaling would significantly impair performance because the necessary coordination between the coder and decoder would be deleteriously affected. Alternatively, two or more subrate channels might be dedicated for signaling purposes. This, however, would reduce the number of channels available for message transmission purposes. Accordingly, while bit compression is potentially most advantageous, it presents its own problems—particularly with signaling transmission.

SUMMARY OF THE INVENTION

It is a primary object of the present invention to achieve a bit compressed digital signal format with embedded signaling yet minimal performance degradation.

The present invention relates to a bit compression multiplexing technique for a pair of time division multiplexed digital bit streams each one of which includes a plurality of PCM encoded signals deposited in separate and distinct channels of a repetitive frame and signaling bits multiplexed therewith. The PCM encoded signals of successive frames are normally bit compressed into n-bit signals, but periodically the encoded signals of a frame are bit compressed into n-1 bit signals. The bit compressed signals (of the pair of bit streams) are time division multiplexed with each other, with the multiplexed compressed signals occupying separate and distinct channels of a repetitive frame. The signaling bits are extracted from the pair of digital bit streams and are inserted into predetermined n-1 bit channels of the last-recited repetitive frame. The signaling bits that are placed in a given channel are related to the message signal of that channel.

BRIEF DESCRIPTION OF THE DRAWINGS

The invention will be more fully appreciated from the following detailed description when the same is considered in connection with the accompanying drawings in which.

DETAILED DESCRIPTION

Figure 1:
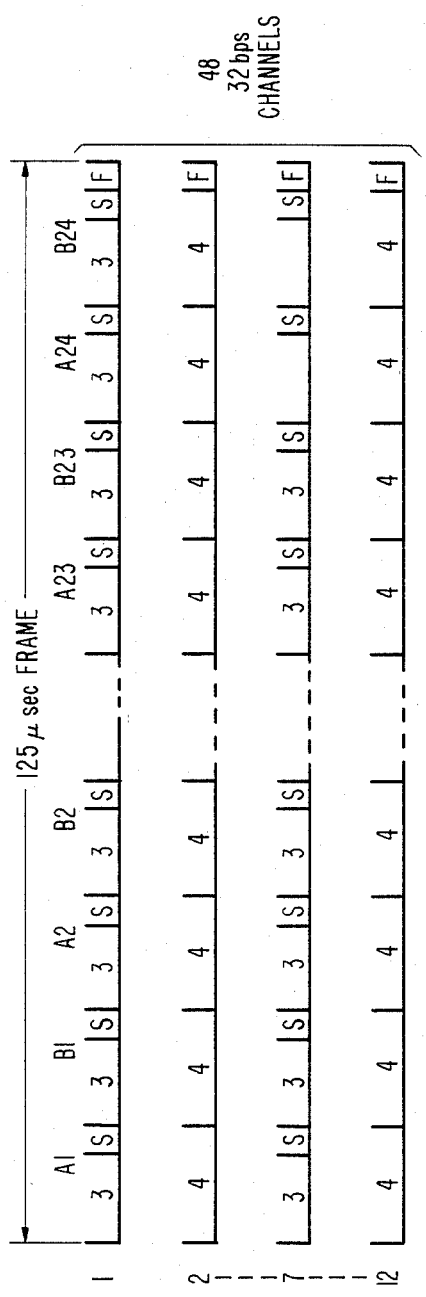
FIG. 1 illustrates the format of a bit compressed multiplexed signal in accordance with the present invention.

FIG. 1 illustrates a bit compressed, multiplexed, digital signal format in accordance with the present invention. The format depicted in FIG.1 is efficient (twice the transmission carrying capacity of DS1), it offers minimal performance degradation, and it is completely transparent to signaling—that is, the signaling bits (e.g., of DS1) are not changed or altered in any manner. The FIG. 1 format is achieved by bit compressing and multiplexing a pair of DS1 signals. However, while the present invention will be described in the context of bit compressing and multiplexing two DS1s, the invention is not so limited; the inventive concepts herein disclosed can be applied to other digital transmission systems which utilize other and different formats.

In accordance with the invention, the 8-bit PCM encoded signals of input (DS1) digroups are normally bit compressed into 4-bit signals, but periodically (every 6th frame) the PCM encoded signals are compressed into 3-bit signals. The bit compressed signals (of input digroups A and B) are time division multiplexed with each other, with the multiplexed compressed signals occupying separate and distinct channels of a repetitive frame (125μ sec). The signaling bits or S-bits are extracted from the pair of input DS1s and are added to predetermined 3-bit channels of a bit compressed frame. The signaling bits that are placed in a given channel are directly related to the encoded message signal of that channel.

FIG. 1 depicts twelve successive frames of the bit compressed multiplexed signal. Each frame comprises forty-eight 32 Kbps channels (4 bits per channel, repeated at an 8 kHz rate). The input digroups A and B each comprise 24 channels and these, after compression, are multiplexed by interleaving the same; i.e., A1, B1, A2, B2..., where the numerals (1, 2 ... 23, 24) indicate channels of digroups A and B. The frame format includes one framing bit for a total of 193 bits per frame. The input PCM encoded signals are normally bit compressed to 4-bit ADPCM signals (e.g., frames 2–6 of FIG. 1). However, every sixth frame (frames 1 and 7 of FIG. 1) the PCM signals are bit compressed to 3-bit ADPCM signals. This permits the spare bit position of the 3-bit ADPCM channels to be used for signaling transmission. The signaling bit(S) inserted into each 3-bit ADPCM channel relates to the encoded message signal of that channel.

Figure 2:
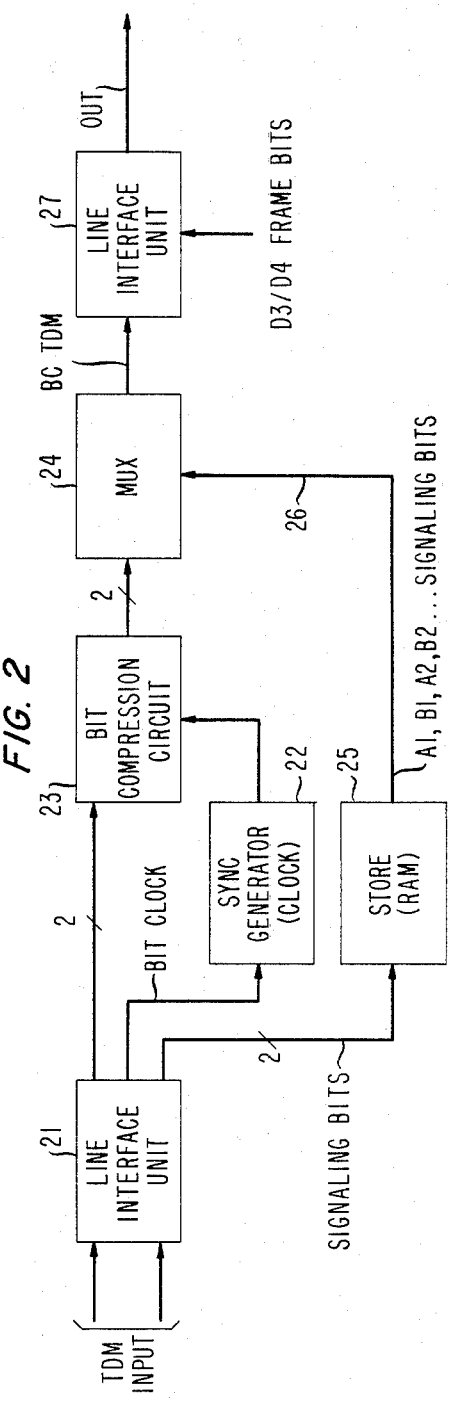
FIG. 2 is a simplified, schematic block diagram of a bit compression multiplexer which develops the frame format shown in FIG. 1.

Turning now to the schematic block diagram of FIG. 2, a pair of time division multiplexed (TDM) digital bit streams (e.g., DS1 digroups) are delivered to the line interface unit 21. As the name implies, the interface unit 21 interfaces the bit compression multiplexer (BCM) of FIG. 2 to other equipment. The interface circuitry will typically include an equalizer circuit for the equalization of gain and/or delay distortion, detectors for facility performance monitoring, provision for DS1 loopback for maintenance, bipolar-to-unipolar conversion, etc. The line interface circuitry is conventional in design and its functions well known to those in the art. One circuit pack of interface 21 contains reference clock extraction circuitry which generates a "bit clock" signal from one of the input DS1 signals. Another interface circuit serves to extract the signaling bits of the input DS1 signals; signaling bit extraction is a standard feature of all digital channel banks, for example.

The synchronization generator (or BCM clock) 22 is "slaved" to the network timing provided by the aforementioned reference clock extraction circuit. A local phase-locked loop (PLL) of generator 22 locks its oscillator to the 1.544 Mhz line clock. The sync generator circuit generates the local clocks and tailored synchronization signals required by the various (block) functions of the FIG. 2 system. In particular, it generates the sync signal required by the dual-mode, bit compression circuit 23.

The interface unit 21 delivers the pair of TDM signals to the bit compression circuit 23. For convenience and hardware simplicity, the TDM output signals from interface 21 should preferably be frame aligned (by buffering). As explained, the circuit 23 serves to normally bit compress each of the received 8-bit PCM encoded signals to 4-bit ADPCM (adaptive differential pulse code modulation), and periodically (every 6th frame) to 3-bit ADPCM. Each of these two modes of operation can be advantageously carried out in accordance with the bit compression algorithm of the cited Petr application. The bit compression circuit 23 will be described in greater detail hereinafter.

The bit compressed TDMs (e.g., compressed DS1 signals) are multiplexed with each other and with the extracted signaling bits in the multiplexer 24 to achieve the bit compressed multiplexed signal shown in FIG. 1. There are, of course, a number of ways of multiplexing the compressed data signals. For purposes of explanation, it is assumed that the channels of the two compressed digroups are interleaved (A1, B1, A2, B2 ... A24, B24). Alternatively, the first 24 channels of the FIG. 1 format could be dedicated to the 24 channels originating from digroup A, with the last 24 channels of the FIG. 1 format dedicated to the channels originating from digroup B. Still other multiplexing arrangements should be readily apparent. The described multiplexing operation is straightforward and can be implemented by a state-of-the-art multiplexer or even by use of a RAM.

The extracted signaling bits from interface 21 are delivered to the store 25, which can comprise a random-access-memory (RAM) or any other suitable state-of-the-art storage device. The extracted signaling bits are written into respective storage locations of the RAM. These storage locations are then accessed or read out in a predetermined manner so that the sequence of signaling bits on the RAM output lead 26 corresponds to the sequence in which these bits are to be inserted into the frame of 3-bit ADPCM channels. For example, for the interleaved multiplexed format shown in FIG. 1, the signaling bits of the A1, B1, A2, B2 ... channels appear in that sequence (A1 S-bit, B1 S-bit ... ) on lead 26. Thus, the RAM, in effect, serves the function of reformatting the signaling bits. However, the signaling bits are not altered or changed in any way. The signaling bit read-out from the RAM occurs, of course, every sixth frame—during a frame of 3-bit ADPCM channels.

The bit compressed, time division multiplexed signal (BC TDM) is coupled to the line interface unit 27, which interfaces the bit compression multiplexer to the transmission network. This interface performs a number of known conventional functions, such as unipolar-to-bipolar conversion, as well as the addition of D3/D4 type frame bits to the outgoing digital bit stream. Alternatively, the more recent, extended superframe bits ($F_e$) might be added at this point.

Figure 3:
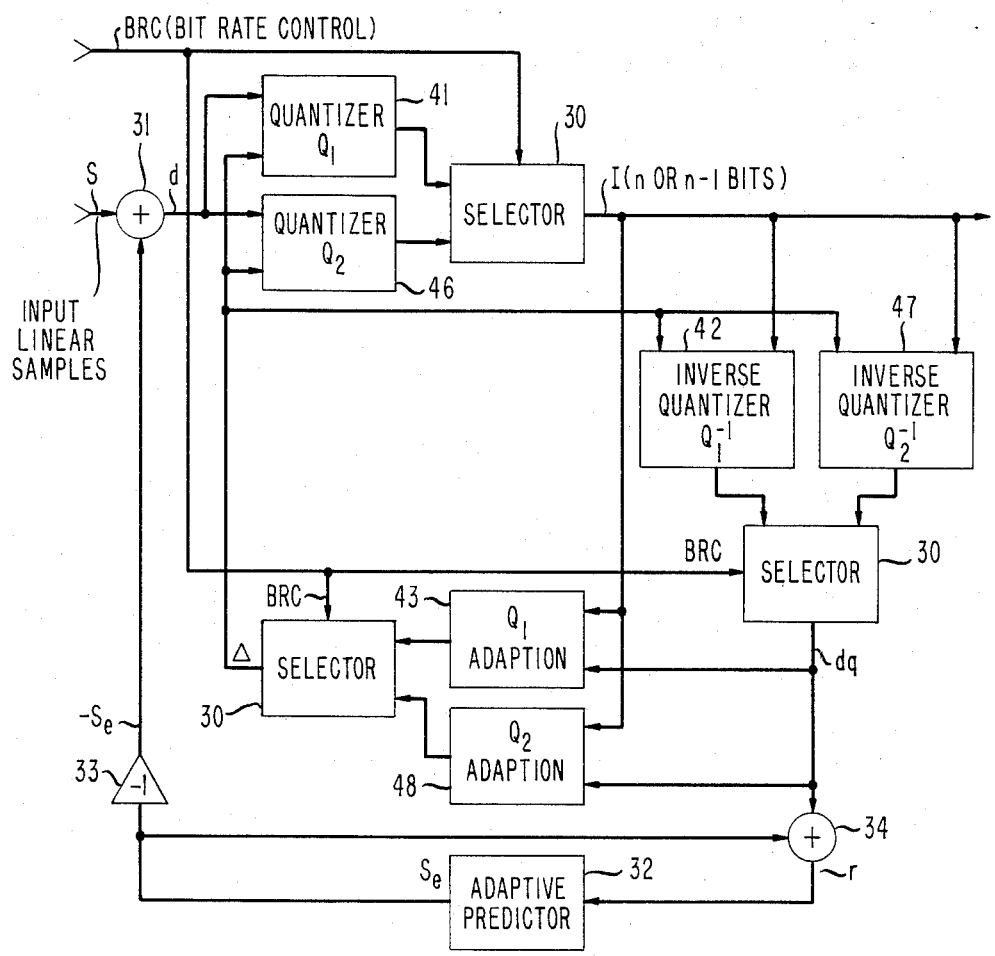
FIG. 3 is a schematic block diagram of the bit compression circuit of FIG. 2.

The dual-mode bit compression circuit 23 is shown in greater detail in FIG. 3. As previously described, this circuit serves to normally bit compress 8-bit PCM encoded signals to 4-bit ADPCM signals and periodically (every 6th frame) to 3-bit ADPCM. Each 8-bit μ-Law PCM ssignal is first converted to a multi-bit (e.g., 13–16 bits) linear PCM sample. The linear PCM samples s are delivered to an algebraic adder or difference circuit 31.

An adaptive predictor 32 provides a predicted signal $s_e$ which is a prediction or an estimate of the sample s. This predicted signal $s_e$ is inverted in inverter 33 and delivered to the other input of the adder circuit 31. As the name implies, the latter circuit provides at its output a difference signal d that is the algebraic addition of the two inputs thereto. The difference signal d is coupled to the input of the quantizers $Q_1$ and $Q_2$.

The $Q_1$ quantizer 41, the $Q_1^{-1}$ inverse quantizer 42 and the $Q_1$ adaptation circuit 43, in combination with the adaptive predictor 32, serve to encode the input linear PCM samples into 4-bit differential PCM signals. A bit rate control (BRC) signal from the sync generator 22 enables the selectors 30 to interconnect the recited circuits during five of every six frames.

The quantizer 41 comprises a multi-level nonuniform adaptive quantizer of scale factor $\Delta$; for $n=4$, a 16-level quantization is possible. As will be appreciated by those in the art, the quantizer 41 not only provides the desired quantization, but it also serves to PCM encode the input signal; the qunatizing and encoding are carried out in one-and-the-same operation (see any standard digital transmission text). This 4-bit output signal I represents the quantized and PCM encoded form of the difference sample d.

This 4-bit PCM output is delivered to the $Q_1^{-1}$ inverse quantizer 42 which, as the designation implies, performs an operation that is essentially the inverse of the operation of block 41. That is, the inverse quantizer 42 receives the 4-bit differential PCM signal I and provides at its output the signal $d_q$. This $d_q$ signal is the quantized version of the difference signal d. The signal $d_q$ is coupled to the input of the $Q_1$ adaptation circuit 43 and to the adder 34. The $s_e$ output of the adaptive predictor 32 is also coupled to an input of the adder 34. The adder 34 serves to add these two input signals so as to provide at its output the reconstructed signal r, which is a close quantized version of the input signal s. The signal sample r is delivered to the adaptive predictor 32, which in response thereto serves to generate the next predicted signal for comparison with the next linear PCM sample. The adaptive predictor 32 uses the sample r and a few previous samples to arrive at a prediction $s_e$ which is the weighted sum of m input samples (e.g., m=4).

The $Q_1$ adaptation circuit 43 receives the quantized difference signal $d_q$ and the 4-bit output I and serves to develop therefrom the adaptive scale factor $\Delta$. This scale factor $\Delta$ is then delivered to the quantizer 41 and to the inverse quantizer 42. The adaptive scale factor $\Delta$ serves to scale the Q and $Q^{-1}$ characteristics to match the power of the input difference signal d. The Q adaptation circuit controls the speed of adaptation of the scale factor $\Delta$; a fast speed of adaptation is provided when the input linear PCM signal represents speech, with a very slow (almost constant) speed of adaptation for input PCM encoded voiceband data or tones. The described ADPCM coding operation is covered in greater detail in the cited Petr application.

Every 6th frame the BRC signal from sync generator 22 enables the selectors 30 to interconnect the $Q_2$ quantizer 46, the $Q_2^{-1}$ inverse quantizer 47, and the $Q_2$ adaptation circuit 48; the interconnections established by the selectors 30 for the two modes of operation are, of course, mutually exclusive. The quantizer 46 serves to encode the input linear samples s into 3-bit output signals I. In all other respects, this 3-bit ADPCM coding operation is similar to the 4-bit operation previously described, and it is in accordance with the bit compression algorithm of the cited Petr application.

A pair of coders such as shown in FIG. 3 can be used to respectively bit compress the 8-bit PCM signals of the TDM bit streams on a time shared basis. And, since the described ADPCM coding can be carried out digitally, it is all readily implemented using a digital signal processor.

The dual-mode coder or compression circuit of FIG. 3 is capable of 16 level (for n=4) and 8 level (for n=3) quantization. For 16/8 level coding, one of the (possible) transmitted 4-bit bytes must, of necessity, be the 0000 byte and one of the 3-bit bytes must be the 000 byte. However, long strings of 0s can result from successive all zero bytes and this is known to create timing problems with certain framing schemes, such as D3/D4 framing. The avoid long strings of 0s, transmission equipment is designed so that a string of more than fifteen 0s in a row will not occur. A common way of handling this problem is the inclusion of circuitry that performs a bipolar N-zero substitution (e.g., B8ZS). Thus, when a block of (8) consecutive zeros is detected, a predetermined word is substituted. At the receiving end of the transmission facility the substituted word is identified and then replaced by the original string of zeros.

In accordance with the principles of the present invention, the timing problem created by strings of 0s is avoided by using 15 level (for n=4) and 7 level (for n=3) quantization. This 15/7 level coding eliminates the need to transmit the 0000 and 000 bytes. And, as a consequence, long strings of 0s can never occur.

Figure 4:
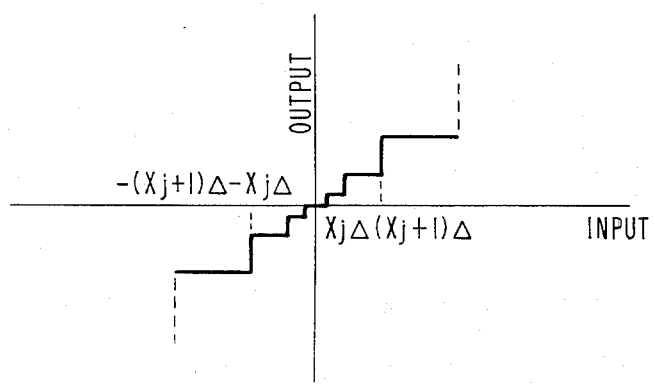
FIG. 4 depicts a coding transfer characteristic.

FIG. 4 depicts a transfer characteristic for 7 level quantization. While this mid-tread transfer characteristic is known, the mid-riser characteristic is the one commonly used for coding. The transfer characteristic is nonuniform (i.e., logarithmic), with the input range divided into N(7 or 15) steps of unequal widths. The transfer characteristic shown by the solid line in FIG. 4 comprises three positive steps or levels, three negative ones and the zero level for a total of 7 levels (for n=3). The 15 level characteristic (for n=4) would, of course, comprise seven positive and seven negative levels or steps. The symbol $\Delta$ represents the adaptive scale factor developed by the $Q_1$ and $Q_2$ adaptation circuits of FIG. 3.

As will be appreciated by those skilled in the art, the demultiplexer and decoder (bit expansion) circuits are essentially mirror images of the multiplexer 24 and coder 23 which they interact, remotely. This remote interaction of the receiver apparatus is coordinated with the transmitter apparatus by the frame bits in accordance with standard operating procedures. Thus, the decoder, for example, by virtue of being coordinated with the coder, expects only three bits every 6th frame and performance degradation is minimized. As with D3/D4 Channel Banks, the signaling framing bits of the frame format advise the remote terminal when to expect the 3-bit (ADPCM) channels.

Digital data (e.g., 56 Kbps data) may be integrated with voice encoded channels to add further network capability. In this case, a 64 Kbps channel is inserted or used in place of channels A1 and B1, for example. Since digital data must not be bit compressed, the coder 23 is made transparent to digital data—i.e., the coder is temporarily placed in a by-pass mode for digital data.

The bit compression multiplexing technique of the present invention is particularly advantageous for the transmission of PCM encoded voiceband data. It's signal-to-noise performance is approximately 15 dB. better than the (previously discussed) straightforward preemption (every 6th frame) of one of the four bits of sub-rate (32 Kbps) channels.

The foregoing disclosure is merely illustrative of the principles of the present invention and numerous modifications or alterations may be devised by those skilled in the art without departing from the spirit and scope of the invention.

What is claimed is:

1. A bit compression multiplexing system (FIG. 2) for a pair of time division multiplexed digital bit streams each of which includes a plurality of PCM encoded signals deposited in separate and distinct channels of a repetitive frame and signaling bits multiplexed therewith comprising means (23) for normally bit compressing the PCM encoded signals of successive frames into n-bit signals and periodically bit compressing a frame of said encoded signals into (n−1) bit signals, means (21) for extracting the signaling bits from the pair of digital bit streams, and multiplex means (24) for time division multiplexing the bit compressed signals of the pair of bit streams so that the multiplexed compressed signals occupy separate and distinct channels of a repetitive frame, said multiplex means also serving to insert the extracted signaling bits into predetermined (n−1) bit channels of the last-recited repetitive frame, the signaling bits placed in a given channel being related to the encoded message signal of that channel.

2. A bit compression multiplex system as defined in claim 1 wherein n=4 and n−1=3.

3. A bit compression multiplex system as defined in claim 2 wherein the bit compressing means comprises a dual-mode ADPCM coder (FIG. 3).

4. A bit compression multiplex system as defined in claim 3 wherein the ADPCM coding is restricted to avoid all-zero output bytes.

5. A bit compression multiplex system as defined in claim 4 wherein a frame of compressed 3-bit signals occurs every sixth frame.

6. A bit compression multiplex system as defined in claim 5 wherein a frame of compressed multiplexed signals is of the same duration as a frame of said pair of digital bit streams.

7. A bit compression multiplex system as defined in claim 6 wherein said encoded signals consist of 8-bit μ-Law PCM signals.

8. A bit compression multiplexing method for a pair of time division multiplexed digital bit streams each of which includes a plurality of PCM encoded signals deposited in separate and distinct channels of a repetitive frame and signaling bits multiplexed therewith comprising the steps of normally bit compressing successive frames of the PCM encoded signals into n-bit signals and periodically bit compressing the encoded signals of a frame into (n−1) bit signals, multiplexing the compressed signals of the pair of bit streams so that the multiplexed compressed signals occupy separate and distinct channels of a repetitive frame, extracting the signaling bits from the pair of the digital bit streams, and placing the extracted signaling bits into predetermined (n−1) bit channels of the last-recited repetitive frame, the signaling bits placed in a given channel being related to encoded message signal of that channel.

* * * * *